United States Patent
Pandya

(10) Patent No.: US 10,044,755 B2
(45) Date of Patent: Aug. 7, 2018

(54) INTEGRATED SECURITY MANAGEMENT

(71) Applicant: Gaurang Kanaiyalal Pandya, Bangalore (IN)

(72) Inventor: Gaurang Kanaiyalal Pandya, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/667,741

(22) Filed: Mar. 25, 2015

(65) Prior Publication Data
US 2016/0219077 A1    Jul. 28, 2016

(51) Int. Cl.
*H04L 29/06* (2006.01)
*H04L 12/24* (2006.01)

(52) U.S. Cl.
CPC .......... *H04L 63/20* (2013.01); *H04L 41/0843* (2013.01); *H04L 41/0893* (2013.01); *H04L 63/0263* (2013.01); *H04L 41/0863* (2013.01); *H04L 41/0869* (2013.01)

(58) Field of Classification Search
CPC .. H04L 63/20; H04L 41/0803; H04L 41/0863
See application file for complete search history.

(56) References Cited

U.S. PATENT DOCUMENTS

| | | | |
|---|---|---|---|
| 6,765,864 B1* | 7/2004 | Natarajan | H04L 41/06 370/224 |
| 8,104,032 B1* | 1/2012 | Sobel | G06F 9/44505 717/168 |
| 2014/0040622 A1* | 2/2014 | Kendall | G06F 21/602 713/171 |

OTHER PUBLICATIONS

ITIL (ITIL Version 3 Chapters, Apr. 27, 2010, 16 pages).*

* cited by examiner

*Primary Examiner* — Oleg Korsak

(57) ABSTRACT

A system for configuring a plurality of security devices is provided. The system is configured to automatically generate one or more policy definition files and use the files to integrally control security configurations for a plurality of security devices in one or more networks. The system includes a security control module and one or more policy agent modules. The security control module converts security parameters to the one or more security policy definition files. The policy agent modules receive the security policy definition files and extract a plurality of policy configuration parameters from the security policy definition file. The plurality of policy configuration parameters is passed to the associated security devices. The security control module maintains communication with other components in the system, such as a checking module and a reporting module.

24 Claims, 12 Drawing Sheets

INTEGRATED SECURITY MANAGEMENT

TECHNICAL FIELD

The present disclosure relates generally to a system for configuring a plurality of security devices. In particular, the present disclosure relates to a system for p providing an integrated security management system useable with a plurality of security devices in a network.

BACKGROUND

The basic computer network infrastructure does not necessarily provide services or features necessary for reasonably integrated computer security. Without appropriate security controls, the computer networks are highly vulnerable to attacks or unauthorized access of critical assets, such as sensitive data or computing resources, within the networks. To minimize the risk from the attacks or unauthorized access, a variety of security devices are used in the computer networks. For example, the security devices are implemented by network security controls, data security controls, and endpoint security controls. The network security controls include, for example, firewalls, routers, network switches, and wireless access points (APs). The data security controls include, for example, data loss prevention (DLP) solutions, encryption, and digital signature. The endpoint security controls include, for example, host-based intrusion detection systems (HIDS), host-based intrusion prevention systems (HIPS), host-based firewalls, and device controls.

Each of the security devices may have its own method and technology to configure security in the network. Further, the mechanics of configuring the security with the security devices may change from one release to another. Therefore, keeping track of different configurations and learning the skills for the different configurations of different security devices can be difficult. Further, the security configured for different computing resources in the networks need to be managed in a coherent way without conflicts, and the configuration applied for each security device should not change unintentionally so that inconsistency is minimized in applying security policies over time.

SUMMARY

In accordance with the following disclosure, the above and other issues are addressed by the following:

In a first aspect, a system for configuring a plurality of security devices is disclosed. The system may include a security control module and a policy agent module. The security control module is executable on a computing system to convert security parameters to a security policy definition file. The policy agent module is executable on a computing system to receive the security policy definition file and extract one or more device-specific policy configuration parameters from the security policy definition file. The one or more policy configuration parameters are associated with one of the plurality of security devices. The policy agent module converts the device-specific policy configuration parameters into a set of commands/scripts in a format that the one of the plurality of security devices can understand. In certain embodiments, the policy agent module can be configured to apply at least one of the one or more policy configuration parameters to one of the plurality of security devices. The at least one of the one or more policy configuration parameters are specific to the one of the plurality of security devices.

In a second aspect, a method for configuring a plurality of security devices is provided. The method may include receiving one or more security parameters through a user interface, automatically generating a security policy definition file from the received security parameters, extracting one or more device-specific policy configuration parameters from the security policy definition file, the one or more policy configuration parameters associated with one of the plurality of security devices, converting the one or more device-specific policy configuration parameters into a set of commands or scripts in a format that the one of the plurality of security devices can understand, and applying at least one of the plurality of policy configuration parameters to the one of the plurality of security devices, the at least one of the one or more policy configuration parameters being specific to the one of the plurality of security devices, respectively.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
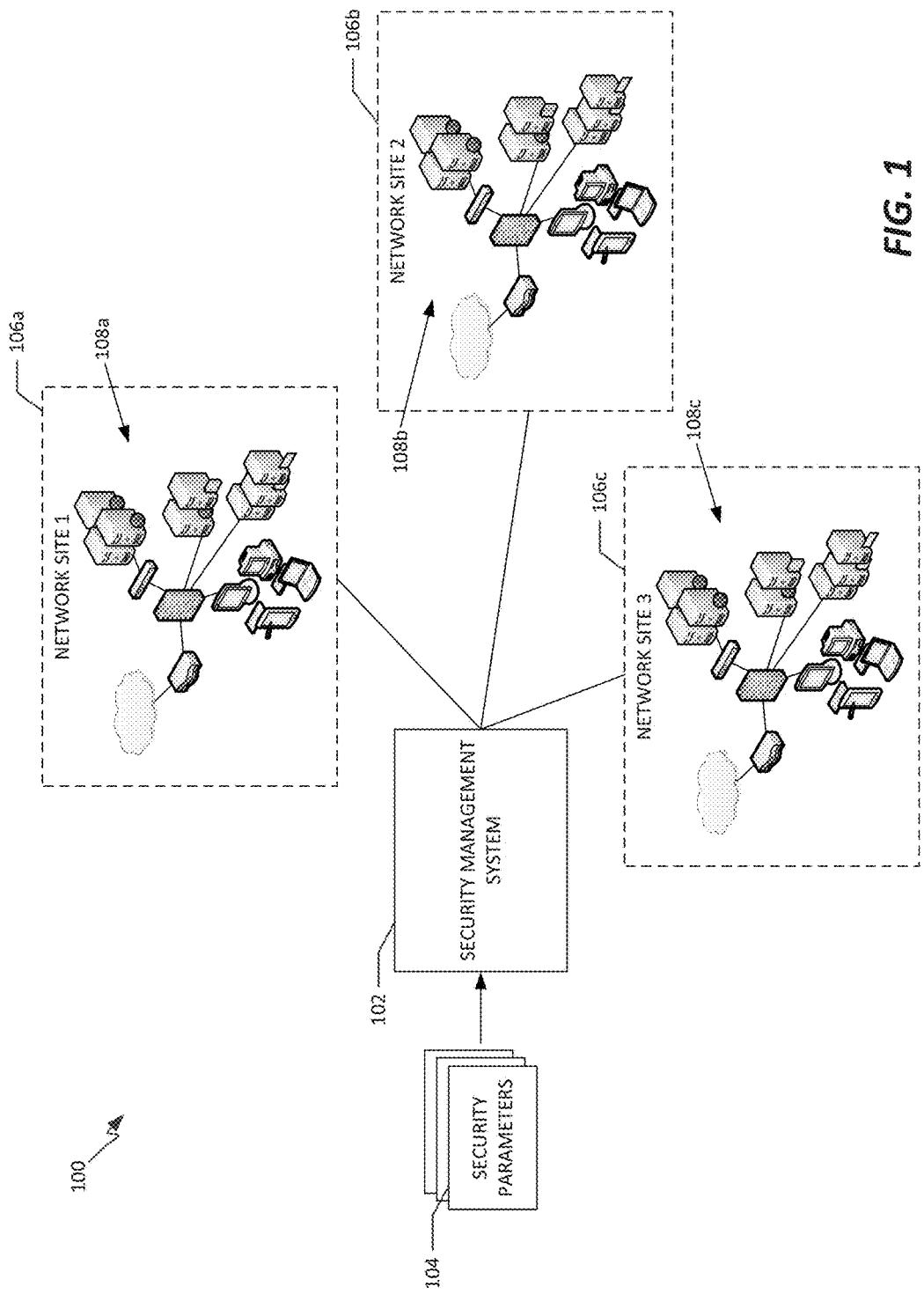
FIG. 1 is an overall schematic view of network security architecture for integrally managing network security for multiple network sites, according to a possible embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to methods and systems for establishing a security management system for integrally controlling a plurality of security devices in a network. The methods and systems disclosed herein provide a single security management system for unifying a number of security policies into a single file that is consumable by a variety of policy-based computing resources of different types within the network. The file will be used for configuring all or at least some of the security devices of different types in the network. Thus, the security management system can consistently perform the security configurations for multiple security devices, thereby efficiently maintaining the integrity of the security control in the network. The methods and systems disclosed herein also provide a feedback mechanism for instant enterprise security posture assessment, as well as for suggesting possible improvement of overall security posture in the network. Further, the methods and systems disclosed herein provide a rollback operation if the security devices are not properly configured to meet security policy requirements. The rollback operation can be either automated or manually performed by a security expert (e.g., a network engineer, operator, and administrator). Other advantages and functionalities are provided by the present disclosure as well.

The security management system in accordance with the present disclosure can achieve simplified enterprise security management using a single console, instant enterprise security posture assessment, reduced human errors and downtime, and better utilization of available resources. The security management system can deploy security policy to appropriate enforcement points (security devices, such as firewalls, intrusion detention/prevention systems, data leak prevention systems, and file servers) using a single unified console. Therefore, a uniform policy can be deployed end-to-end at various security enforcement points. The unified console of the security management system in accordance with the present disclosure also eliminates the dependency on different individual security experts in making different security decisions. The security management system is configured to deploy security policy configuration to each of the security enforcement devices and applications in a network site.

When receiving a request for security requirements or changes from an end-user, the security management system can perform, among other things, (1) identifying the security devices that will be affected by the changes, (2) building security configuration to be pushed to the security devices regardless of the vendors or models of the devices, (3) taking backup of the existing configuration, (4) pushing the new configuration to the security devices to meet the new requirements, (5) testing if the newly pushed configuration has been functioning as required, and (6) rolling back to the previous configuration if there is a problem with the newly pushed configuration.

FIG. 1 is an overall schematic view of network security architecture 100 for integrally managing network security for multiple network sites, according to a possible embodiment of the present disclosure. The network security architecture 100 can include a security management system 102, one or more security parameters 104, and a plurality of network sites 106a-c (referred to generally as one or more network sites 106).

The security management system 102 operates to integrally control a plurality of computing resources including security devices in one or more of the network sites 106. In at least some embodiments, the security management system 102 is configured to receive one or more security parameters 104 and perform different security configurations on different security devices in the network sites 106 based upon the received security parameters 104. An example of the security management system 102 is illustrated and described in more detail with reference to FIG. 2.

The security parameters 104 are one or more pieces of information associated with network security management, and input by a user, such as a security expert (including an engineer, operator, and administrator). In at least some embodiments, the security parameters 104 include security policy information for implementing security configuration on the plurality of security devices in the network site 106. An example of the security parameters 104 are illustrated and described in more detail with reference to FIG. 4.

As described, the security management system 102 can manage one or more different network sites 106. Each of the different network sites 106 may include different types of computing resources 108a-c (referred to generally as one or more computing resources 108) including network hosts, such as general computing devices, specific or special-purpose computing devices, database systems, and other types of computing devices. The computing resources within the network sites 106 may further include different security devices 110 (FIG. 2), such as network security controls, data security controls, and endpoint security controls. The network security controls may include, for example, firewalls (including web application firewalls), routers, network switches, intrusion detection and prevention systems (IDPS), and wireless access points (APs). The data security controls may include, for example, data loss prevention (DLP) solutions, encryption, and digital signature. The endpoint security controls include, for example, host-based intrusion detection systems (HIDS), host-based intrusion prevention systems (HIPS), host-based firewalls, and device controls.

It is recognized that the plurality of security devices 110 in each of the network sites 106 should be appropriately configured such that the security devices 110 operate to protect the computing resources 108 from unauthorized access. Therefore, each of the plurality of security devices 110 in the networks 106 is typically managed by one or more security experts, such as engineers, operators, and/or administrators. The experts need to accurately understand different security configurations for different security devices 110 and implement different security configurations to corresponding security devices without error. Further, the security configurations of the security devices 110 should be continuously monitored and analyzed to ensure that they operate as desired. It is noted that the different security policies (including security configurations) for different security devices 110 are at least partially related each other to maintain the integrity of the network security throughout the entire network 106. Thus, the different security polices need to be coherent and/or synchronized among different security devices in the network 106. For example, the policy configurations that are related to each other need to be applied in sync across the security devices 110 and maintained up-to-date throughout the entire network 106. Further, firewall rules can be required to be in sync among all of the firewalls used in each network 106. In some embodiments, the firewall features of routers and switches need to be used to a full extent. The network 106 can require a password policy to be uniformly enforced on the computing resources 108 including different hosts and security devices 110. In some embodiments, it can be desired to encrypt data in rest as well as in transit. Policies can be required to be in sync for network-based DLP solutions and host-based DLP solutions. In some embodiments, share permission on one or more file servers needs to be consistently managed across servers and platforms. It can be also important to ensure intrusion detection systems (IDS) and/or security information and event management (SIEM) systems to monitor for policy violations through the entire network 106. In some embodiments, a policy configuration of a web application firewall needs to be in line with web application input principles. However, as the number of the security devices 110 used in the network 106 increases, it becomes more difficult to appropriately manage all of the security configurations without conflicts or error for all of the security devices 110, and several issues or problems relating to security policy integrity may occur among different security configurations on different security devices.

In embodiments of the present disclosure, these and other problems are addressed by providing a single system (e.g., the security management system 102) for unifying security policies (including policy configurations) into a policy definition file and configuring all security devices 110 in a network site based upon the unified policy definition file. The system can integrate at least a portion, or all, of the security policies (e.g., the network security controls, the data security controls, and the endpoint security controls, as described). The system can simplify overall enterprise security management and reduce dependency on security configuration subject matter experts, thereby decreasing human errors and time for security management. The system does not require security professionals to learn too much information to configure different security devices and manage them simultaneously. Further, the system allows instant enterprise security posture assessment by providing feedback mechanism to improve overall security posture in the network. The system can therefore enable better utilization of existing resources to provide a higher degree of security to the network.

Figure 2:
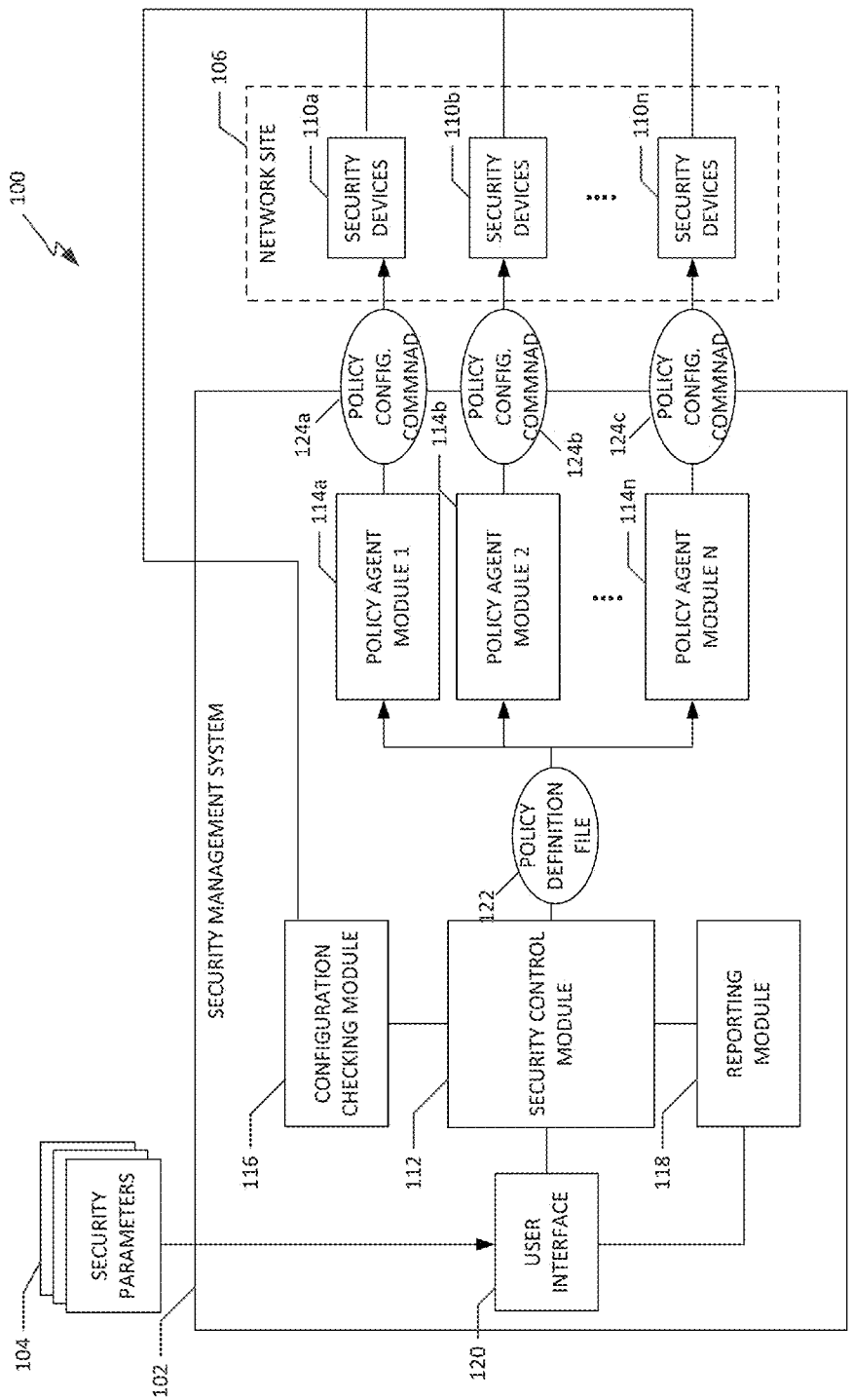
FIG. 2 is a block diagram of an example security management system in accordance with a possible embodiment of the present disclosure.

FIG. 2 is a block diagram of an example security management system 102 in accordance with a possible embodiment of the present disclosure. The security management system 102 can include a security control module 112, one or more policy agent modules 114*a-n* (referred to generally as one or more policy agent modules 114), a configuration checking module 116, a reporting module 118, and a user interface 120. In at least some embodiments, a single policy definition file 122 is used in the security management system 102 to manage the security devices 110 in a single network site 106. Also shown are one or more policy configuration parameters 124*a-n* (referred to generally as one or more policy configuration parameters 124) passed to the security devices 110. The policy configuration parameters can also be referred to herein as policy configuration commands or policy configuration scripts. The security management system 102 can be implemented, for example, in one or more computing systems, such as the system described below in connection with FIG. 3.

The security control module 112 can operate to receive one or more security parameters 104 via the user interface 120 and convert the security parameters 104 into the policy definition file 122, which are then passed to the one or more policy agent modules 114. The security control module 112 further operates to communicate with the other modules, such as the policy agent modules 114, the configuration checking module 116, and the reporting module 118. The security control module 112 operates to continuously or periodically monitor if the other modules are active and working properly. In some embodiments, if the security control module 112 detects that a certain module does not work properly, it can operate to fix or restart the module. An example of the security control module 112 is illustrated and described in more detail with reference to FIG. 5.

The policy agent modules 114 can operate to control and configure the security devices 110 (including the security devices 110*a-n*) that the policy agent modules 114 serve, respectively, in the network site 106. In at least some embodiments, the policy agent modules 114 are designed to control the associated security devices 110, respectively, at the network site 106. In the depicted embodiment, a first policy agent module 114*a* serves a first security device 110*a* in the network site 106. A second policy agent module 114*b* controls a second security device 110*b* in the network site 106. Similarly, a $n^{th}$ policy agent module 114*n* controls a $n^{th}$ security device 100*n* in the network site 106.

As described, the network site 106 can include a plurality of security devices 110 that can be of different types, such as network security controls, data security controls, and endpoint security controls. The network security controls may include, for example, firewalls (including web application firewalls), routers, network switches, intrusion detection and prevention systems (IDPS), and wireless access points (APs). The data security controls may include, for example, data loss prevention (DLP) solutions, encryption, and digital signature. The endpoint security controls include, for example, host-based intrusion detection systems (HIDS), host-based intrusion prevention systems (HIPS), host-based firewalls, and device controls. The security devices 110 can include other security controls, in other embodiments.

The policy agent modules 114 generally operate to receive the policy definition file 122 and parse the policy definition file 122 to pass network policy configurations (e.g., the policy configuration parameters 124) to the associated security devices 110 in the network site 106. As described above, the policy agent modules 114 can be assigned to the security devices 110, respectively. In at least some embodiments, each of the policy agent modules 114 can fetch only the policy definition file 122 that is specific to the network site 106 to which the security device 110 it serves belongs. The policy agent modules 114 can then analyze the received policy definition file 122 to obtain the security configurations (e.g., the policy configuration parameters 124) associated with the security devices 110 that the policy agent modules 114 control. Each of the policy agent modules 114 can be configured to pass the security configurations (e.g., the policy configuration parameters 124) only to its relevant security device 110. An example of the policy agent module 14 is illustrated and described in more detail with reference to FIG. 9.

The checking module 116 operates to monitor whether the policy agent modules 114 operates properly to configure the associated security devices 110 thereof as required. In at least some embodiments, the checking module 116 can check if the policy agent modules 114 appropriately pass the security configuration information to the associated security devices 110 such that the security devices 110 are configured as desired. In some embodiments, if it is found that a policy agent module 114 has not configured the associated security device 110 as per requirement, the checking module 116 can send a message to the security control module 112, which will instruct the policy agent module 114 to initiate a rollback process. In the rollback process, the policy agent module 112 operates to deploy the previous security configuration into the security device 110. An example of the checking module 116 is illustrated and described in more detail with reference to FIG. 12.

The reporting module 118 operates to generate a report of information associated with the security devices 110. In at least some embodiments, the reporting module 118 can report configuration information of the security devices 110 in the network site 106. In addition to the configuration information, the reporting module 118 can include a variety of information associated with security management. Examples of the information reported by the reporting module 118 can include resource access details, user/group access details, and security compliance. The report generated by the reporting module 118 can further include proposals for improving security policies and optimizing associated rules. In other embodiments, the reporting module 118 can report other information than described herein.

In some embodiments, the reporting module 118 can output a report via the user interface 120. For example, where the user interface 120 includes a display screen, the reporting module 118 can communicate with the user interface 120 to display the report onto the display screen of the user interface 120.

The reporting module 118 can fetch information from the user request with the security parameters 104, the security control module 112, and other modules to provide appropriate reporting. The reports can be customized, scheduled, and sent over to an email ID specified for reporting configuration. Examples of the reports can include various pieces of information, such as resource access details, user/group access details, compliance reporting, rules optimization reporting, and policy improvement.

The user interface 120 operates to receive a user input or command for entering the security parameters 104 to the security management system 102. The security engineers and/or administrators can interact with the user interface 120 to input the security parameters 104.

Unlike the plurality of policy agent modules 14 as depicted in FIG. 2, other embodiments of the security management system 102 can include a single policy agent module 114 to control a plurality of security devices 110 in a network site 106. In other embodiments, unlike a single policy definition file 122 configured to manage a single network site 106 as depicted in FIG. 2, the security control module 112 can generate a single policy definition file 122 designed to control the security devices 110 in a plurality of the network sites 106.

Figure 3:
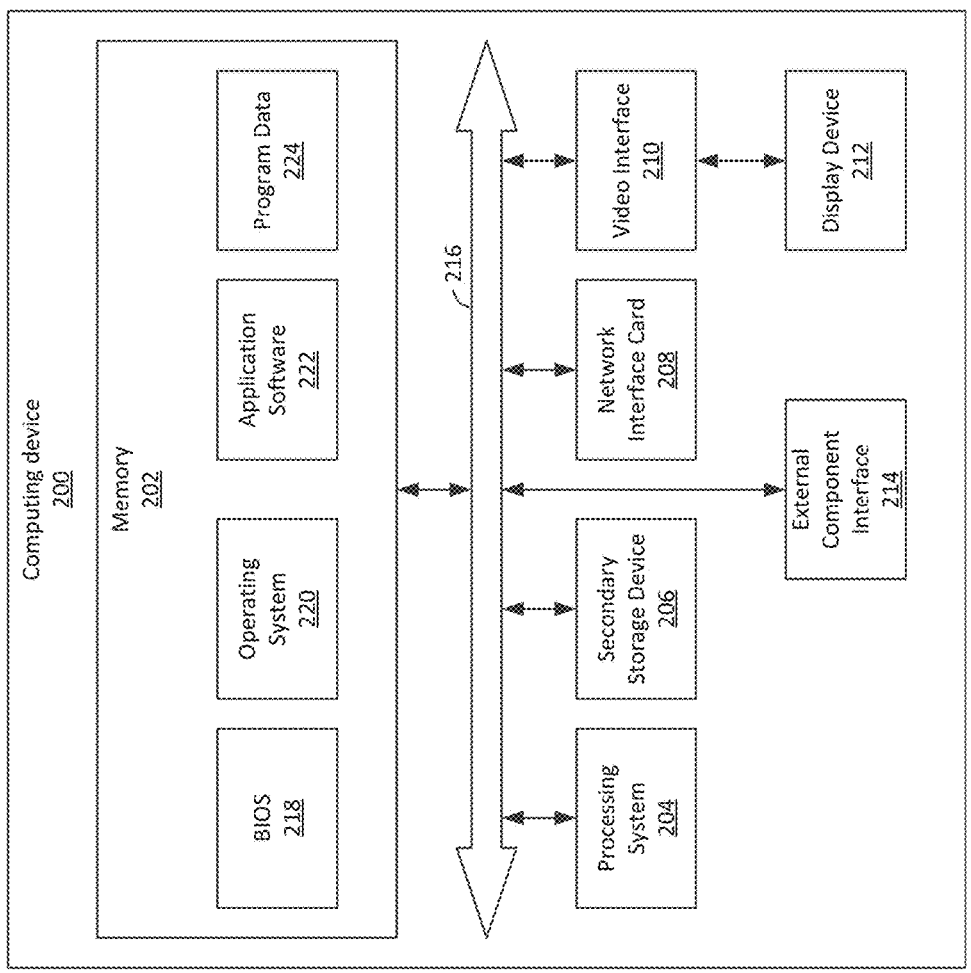
FIG. 3 is a block diagram illustrating example physical details of an electronic computing device, with which aspects of the present disclosure can be implemented.

FIG. 3 is a block diagram illustrating an example computing device 200. In some embodiments, the security management system 102 and/or a device with the security management system 102 are implemented as one or more computing devices like the computing device 200. Further, at least some of the computing resources 108 can be implemented as one or more computing devices like the computing device 200. It should be appreciated that in other embodiments, the security management system 102, a device with the security management system 102, and/or the computing resources 108 can be implemented using computing devices having hardware components other than those illustrated in the example of FIG. 3.

In the example of FIG. 3, the computing device 200 includes a memory 202, a processing system 204, a secondary storage device 206, a network interface card 208, a video interface 210, a display unit 212, an external component interface 214, and a communication medium 216. The memory 202 includes one or more computer storage media capable of storing data and/or instructions. In different embodiments, the memory 202 is implemented in different ways. For example, the memory 202 can be implemented using various types of computer storage media.

The processing system 204 includes one or more processing units. A processing unit is a physical device or article of manufacture comprising one or more integrated circuits that selectively execute software instructions. In various embodiments, the processing system 204 is implemented in various ways. For example, the processing system 204 can be implemented as one or more processing cores. In another example, the processing system 204 can include one or more separate microprocessors. In yet another example embodiment, the processing system 204 can include an application-specific integrated circuit (ASIC) that provides specific functionality. In yet another example, the processing system 204 provides specific functionality by using an ASIC and by executing computer-executable instructions.

The secondary storage device 206 includes one or more computer storage media. The secondary storage device 206 stores data and software instructions not directly accessible by the processing system 204. In other words, the processing system 204 performs an I/O operation to retrieve data and/or software instructions from the secondary storage device 206. In various embodiments, the secondary storage device 206 includes various types of computer storage media. For example, the secondary storage device 206 can include one or more magnetic disks, magnetic tape drives, optical discs, solid state memory devices, and/or other types of computer storage media.

The network interface card 208 enables the computing device 200 to send data to and receive data from a communication network. In different embodiments, the network interface card 208 is implemented in different ways. For example, the network interface card 208 can be implemented as an Ethernet interface, a token-ring network interface, a fiber optic network interface, a wireless network interface (e.g., WiFi, WiMax, etc.), or another type of network interface.

The video interface 210 enables the computing device 200 to output video information to the display unit 212. The display unit 212 can be various types of devices for displaying video information, such as a cathode-ray tube display, an LCD display panel, a plasma screen display panel, a touch-sensitive display panel, an LED screen, or a projector. The video interface 210 can communicate with the display unit 212 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 214 enables the computing device 200 to communicate with external devices. For example, the external component interface 214 can be a USB interface, a FireWire interface, a serial port interface, a parallel port interface, a PS/2 interface, and/or another type of interface that enables the computing device 200 to communicate with external devices. In various embodiments, the external component interface 214 enables the computing device 200 to communicate with various external components, such as external storage devices, input devices, speakers, modems, media player docks, other computing devices, scanners, digital cameras, and fingerprint readers.

The communications medium 216 facilitates communication among the hardware components of the computing device 200. In the example of FIG. 3, the communications medium 216 facilitates communication among the memory 202, the processing system 204, the secondary storage device 206, the network interface card 208, the video interface 210, and the external component interface 214. The communications medium 216 can be implemented in various ways. For example, the communications medium 216 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 202 stores various types of data and/or software instructions. For instance, in the example of FIG. 3, the memory 202 stores a Basic Input/Output System (BIOS) 218 and an operating system 220. The BIOS 218 includes a set of computer-executable instructions that, when executed by the processing system 204, cause the computing device 200 to boot up. The operating system 220 includes a set of computer-executable instructions that, when executed by the processing system 204, cause the computing device 200 to provide an operating system that coordinates the activities and sharing of resources of the computing device 200. Furthermore, the memory 202 stores application software 222. The application software 222 includes computer-executable instructions, that when executed by the processing system 204, cause the computing device 200 to provide one or more applications. The memory 202 also stores program data 224. The program data 224 is data used by programs that execute on the computing device 200.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Accordingly, in the embodiments contemplated herein, computer storage media includes at least some tangible medium or device. In certain embodiments, computer storage media includes entirely non-transitory media and/or devices. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 4:
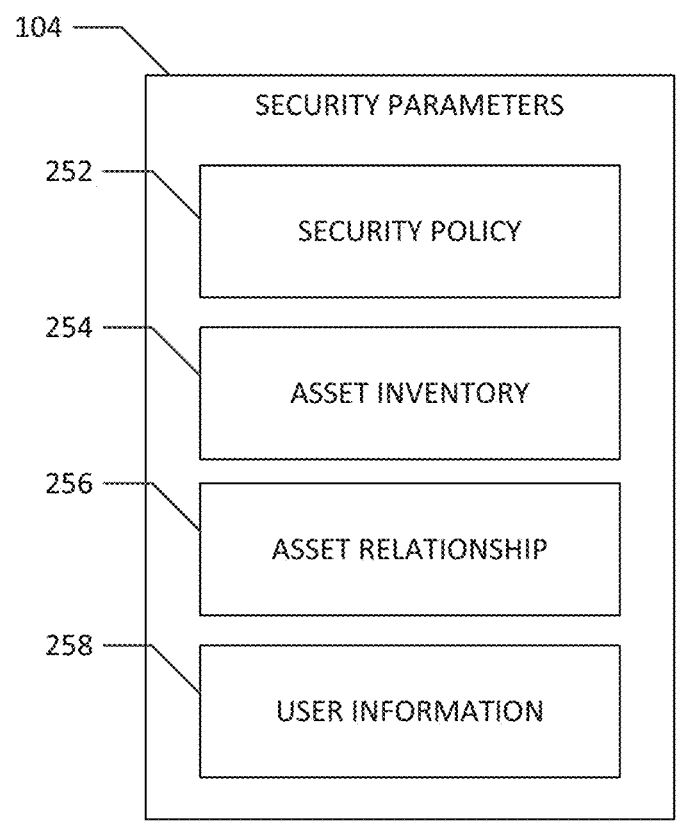
FIG. 4 illustrates example security parameters, according to some embodiments discussed herein.

FIG. 4 illustrates example security parameters 104. The security parameters 104 are one or more pieces of information associated with network security management. In at least some embodiments, the security parameters 104 include security policy information 252 for implementing security configuration on the plurality of security devices 110 in the network site 106. The security policy information 252 is a group of policies, standards, and/or guidelines that represent the requirements that must be in place implemented on the security devices 110 to protect the security and integrity of the network site 106. The security policy information 252 may include network security policy information, data security information, and end-point security information. For example, the security policy information may include organizational security policy with necessary information containing end-users, clearance, and resources, and other different types of information, such as password policies, access policies, encryption policies, data classification policies, audit policies, and any other information used to configure security.

In addition to the security policy information, the security parameters 104 can further include other information for network security management. For example, the security parameters 104 can include asset inventory information 254, asset relationship information 256, and user information 258. The asset inventory information 254 can contain information about different assets to be protected, as well as the values, locations, and/or exposure of the assets in the network. The asset relationship information 256 can represent relationships between the assets within a network and describe the nature of the relationships. The asset relationship information 256 provides importance of each asset relative to other assets, which enables the system to understand a network topology, a system dependency and other information, thereby helping informed decisions. The asset relationship information 256 can be used to build a network topology internally, which is used by the policy agent modules 114 to determine whether a certain policy needs to be deployed in a particular security device 110. The user information 258 relates security-related information about end users of the networks 106, such as credentials, clearance, and group membership. Examples of the user information 258 can include the identity of end users who are granted access to one or more of the computing resources 108 in the networks 106, and the authentication information for the end users.

The security parameters 104 are not limited to those illustrated in FIG. 4. In other embodiments, however, the security parameters 104 can include other pieces of information or parameters, in addition to or alternatively to those depicted in FIG. 4.

Figure 5:
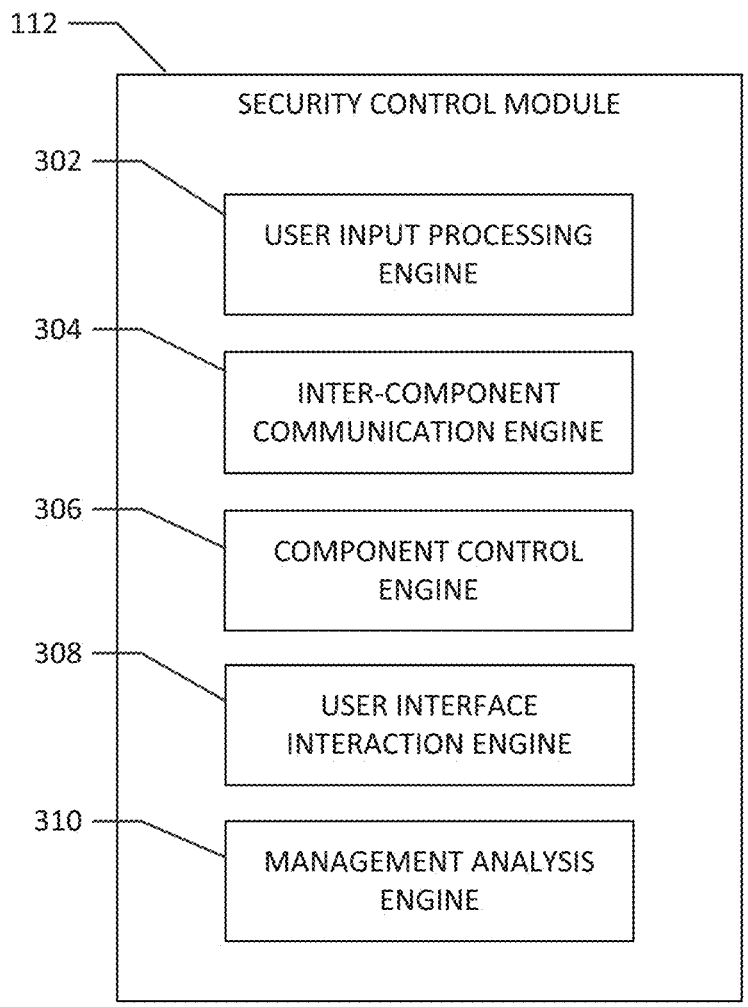
FIG. 5 illustrates an example security control module in accordance with an embodiment of the present disclosure.

FIG. 5 illustrates an example security control module 112 in accordance with an embodiment of the present disclosure. In at least some embodiments, the security control module 112 can include an input processing engine 302, an inter-component communication engine 304, a component control engine 306, a user interface interaction engine 308 and a management analysis engine 310.

The security control module 112 operates as a central coordinator, enabling different components (e.g., the policy agent modules 114, the configuration checking module 116, the reporting module 118, and the user interface 120) to communicate with each other. The security control module 112 monitors the communication among the modules 114, 116, 118 and 120 and ensures that they function as required.

For example, the user interface 120 can communicate with other modules through the security control module 112. Other than the coordination and communication functionality, the security control module 112 can also analyze the information regarding security management and provide suggestions to improve the overall security posture of an enterprise. This is possible because the security control module 112 has a wide range of access to the other associated components in the system.

Figure 6:
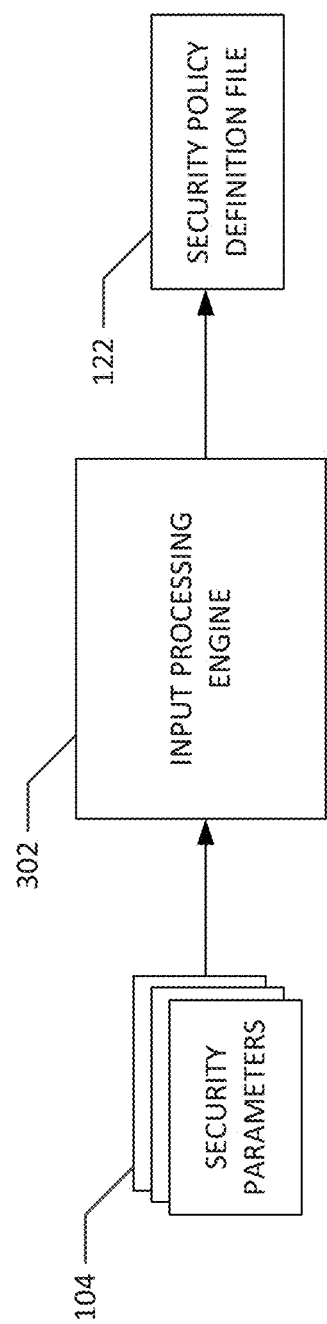
FIG. 6 illustrates an example operation of the security control module of FIG. 5.

The input processing engine 302 operates to receive the security parameters 104 via the user interface 120, and convert the received security parameters 104 into one or more policy definition files 122 (FIG. 6). Further, the input processing engine 302 can integrate the new policy definition files 122 into the existing policy definition files. For example, the input processing engine 302 can replace some of the old policies with new ones or add new policies into existing policies. As described, the policy definition files 122 are designed in a format understandable and consumable by the components (such as the policy agent module 114, the checking module 116, and the reporting module 118) of the security management system 102. In some embodiments, the policy definition files 122 can be designed to be site-specific, which means that each of the policy definition files 122 is generated to be used for the security devices 110 within only one network site 106. In at least some embodiments, if a change requested through the security parameters 104 affects more than one network sites 106, all of the policy definition files 122 associated with the network sites 106 are modified. An example of the policy definition files 122 is illustrated and described in more detail with reference to FIG. 8.

As described with reference to FIG. 4, the security parameters 104 that the input processing engine 302 requires from an end-user include organizational security policy with necessary information such as end-users, clearance and resources, asset inventory directly or indirectly managed by the system, end-user details (e.g., credentials, clearance, and group membership), and asset relationship. The inter-component communication engine 304 operates to coordinate with the other components of the security management system 102 and enable the other components to communicate with each other. For example, the configuration checking module 116 and the policy agent modules 114 can communicate with each other through the inter-component communication engine 304 of the security control module 112. In at least some embodiments, the inter-component communication engine 304 is configured to allow every other component to communicate with the security control module 112 and with every other component through the security control module 112. Accordingly, the inter-component communication engine 304 enables the security control module 112 to keep track of activities and provide audit trail as necessary; restore the system to an older state if necessary; make the system modular (i.e., a change in one module will not affect other modules); and ease inter-module communication.

For example, the inter-component communication engine 304 operates to manage communication with the policy agent modules 114. The inter-component communication engine 304 can be used to provide the policy definition file 122 to the policy agent modules 114. Further, the inter-component communication engine 304 can be used to send different messages to the policy agent module 114 to prompt the policy agent module 114 to perform several functions associated with the messages. For example, as described herein, the inter-component communication engine 304 can send a rollback message to the policy agent module 114 to perform a rollback of the security configuration on its associated security device 110, which is identified in the rollback message.

Further, the inter-component communication engine 304 operates to manage communication with the checking module 116. The inter-component communication engine 304 can be used to provide the policy definition file 122 to the checking module 116 for further processes in the checking module 116, as described herein.

The inter-component communication engine 304 also operates to manage communication with the reporting module 118 and provide information to the reporting module 118 to enable the reporting module 118 to generate a security management report. The information provided to the reporting module 118 can include configuration information of the security devices 110 in the network site 106. The information can further include resource access details, user/group access details, security compliance, and other information associated with security management in the networks.

The component control engine 306 operates to ensure that each component functions as required and report any issue or communication problem. In at least some embodiments, the component control engine 306 can provide early warnings for any adversaries that can happen in the system. The component control engine 306 can also perform necessary actions to recover a failing module and provide first aid support to help the system administrator perform necessary job conveniently. The component control engine 306 can operate to ensure that the task submitted by one component to another is carried out and the result thereof is delivered back to the requesting component. For example, when the configuration checking module 116 requests the security control module 112 to get the previous policy reverted by the policy agent module 114, the security control module 112 passes the relevant information about configuration to the policy agent module 114 and signals the configuration checking module 116 about completion about this activity with success failure result.

The user interface (UI) interaction engine 308 operates to enable an end-user to communicate with the security management system 102. The UI interaction engine 308 receives input from the end-user and provides the input to the security control module 112. The UI interaction engine 308 can also forward output from the security control module 112 to the end-user. In at least some embodiments, the security control module 112 can provide a set of communication APIs to make the development of the user interface easy and independent. Such flexibility in designing the user interface allows customizing user experience to match the users' needs. For example, the user interface can be customized to allow a security administrator to have complete control of setup; permit a security analyst to see alerts and reports; and allow top management to see strategic view and complete security posture of the organization. Further, a command line interface can be provided to help in automating the frequently performed activities. In at least some embodiments, the user interface can be either a standalone application or a web-based application.

In some embodiments, the security control module 112 can include the management analysis engine 310 that is configured to analyze security-related information and propose improvement in security configuration and management for the security devices 110 in the networks 106. The management analysis engine 310 can use various data (e.g., implementation feedback) relevant to security policy information, which is possessed by the security control module 12, analyze the data to identify existing or potential issues, and suggest possible improvement in the security configuration and other security management. In some embodiments, the policy agent modules 114 can also be configured to provide security policy information, such as implementation feedback, to the security control module 112 (e.g., the management analysis engine 310). The management analysis engine 310 can provide the result of the analysis and proposals to the reporting module 118 via the UI interaction engine 308 so that the reporting module 118 reports the result via, for example, the user interface 120.

Figure 7:
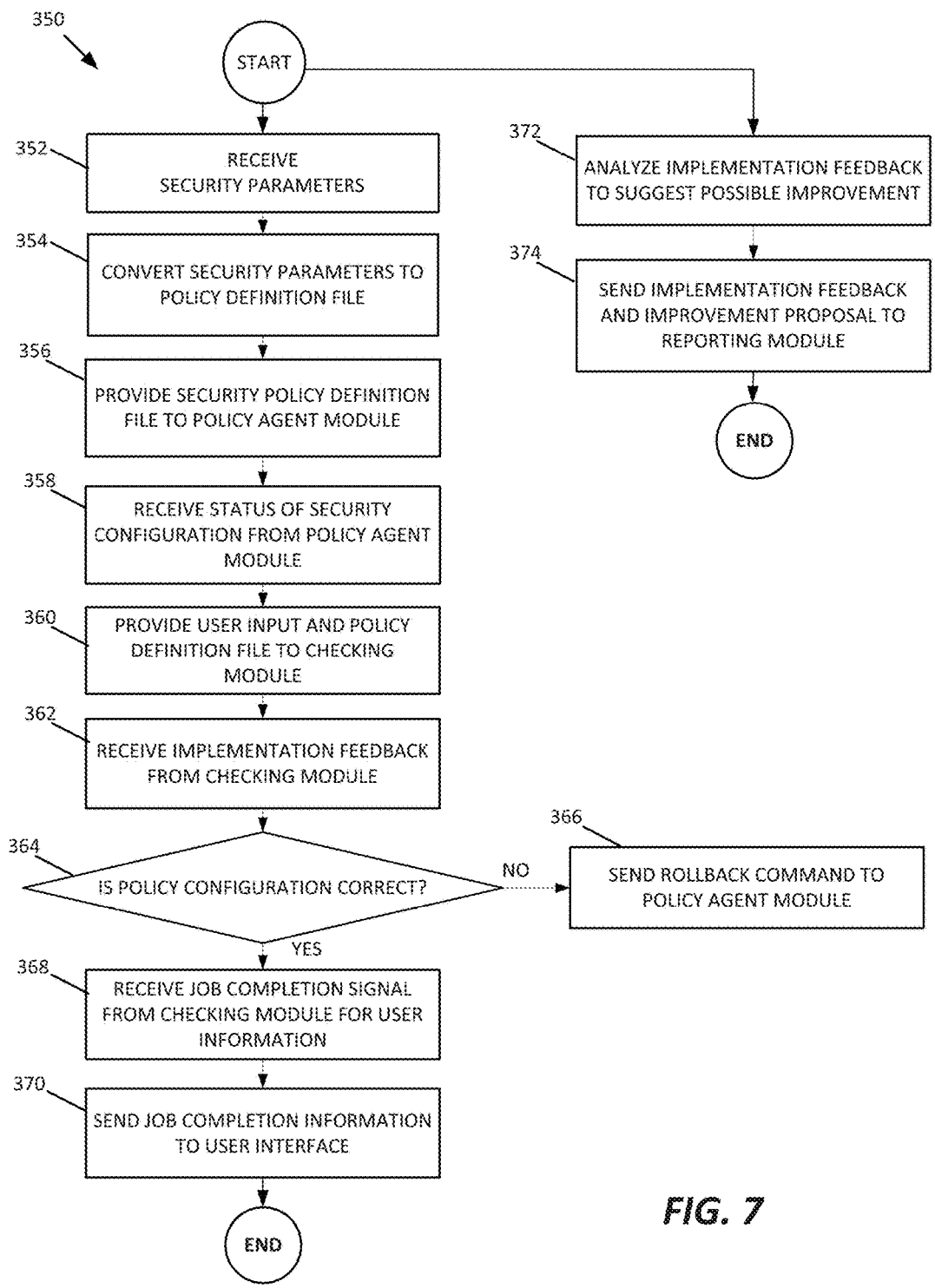
FIG. 7 is a flowchart illustrating an example method of operating the security control module of FIG. 5.

FIG. 7 is a flowchart illustrating an example method 350 of operating the security control module 112. In at least some embodiments, the method 350 may be performed by an application or process executing on one or more computing devices in the security management system 102. The computing devices can be configured as ones described with reference to FIG. 3. Furthermore, the method may be performed in software, hardware, or a combination of both software and hardware.

In the embodiment shown, the method 350 can begin with operation 352 in which the security control module 112 receives the security parameters 104 through the user interface 120. At operation 354, the security control module 112 converts the security parameters 104 and generate a policy definition file 122 in a format consumable by the other modules in the security management system 102. At operation 356, the security control module 112 provides the policy definition file 122 to the policy agent modules 114. The policy agent modules 114 fetches the security policy information from the file 122, the security policy information only associated with the security devices 110 that the policy agent modules 114 serve, respectively. The policy agent modules 114 then convert the information into the policy configuration parameters 124 and push the policy configuration parameters 124 to the security devices 110 that the policy agent modules 114 serve.

At operation 358, the security control module 112 receives from the policy agent module 114 a status of security configuration pushed by the policy agent module 114. At operation 360, the security control module 112 provides the user input (e.g., the security parameters 104) and the policy definition file 122 to the checking module 116 for further operations of the checking module 116. The checking module 116 then performs configuration check. If the checking module 116 detects that the policy configuration is not properly implemented, it can command the policy agent module 114 through the security control module 112 to perform a rollback process. If the checking module 116 detects that the policy configuration is proper, it signals the security control module 112 accordingly. In either case, the checking module 116 sends implementation feedback to the security control module 112.

At operation 362, the security control module 112 receives the implementation feedback from the checking module 116. The implementation feedback is information relevant to security policy implemented in the network 106. The implementation feedback can include configuration information or status of the security devices 110 in the network 106. For examples, the implementation feedback can include whether the policy agent modules 114 have properly worked to configure the security devices 110 as desired.

At operation 364, if it is determined that the policy configuration has not been properly implemented ("NO" at the operation 362), the security control module 112 sends a rollback command to the policy agent module 114 (operation 366) so that the policy agent module 114 performs a rollback process on the associated security device 110. An example of the rollback process is illustrated and described in more detail with reference to FIG. 12. If it is determined that the policy configuration has been successfully pushed by the policy agent module 114 ("YES" at the operation 362), then the method 350 continues to operation 368.

At operation 368, the security control module 112 can receive a job completion signal from the checking module 116. At operation 370, the security control module 112 can send the job completion information to the user interface for user information.

Concurrently with operations 352 through 370, the security control module 112 can continuously or periodically perform operations 372 and 374. At operation 372, the security control module 112 analyzes the implementation feedback and suggests possible improvement in implementing security policy, such as policy configurations of the security devices 110. At operation 374, the security control module 112 can send the implementation feedback, the result of the analysis (including the improvement proposal) to the reporting module 118, and the reporting module 118 can output the received information via the user interface 120.

Figure 8:
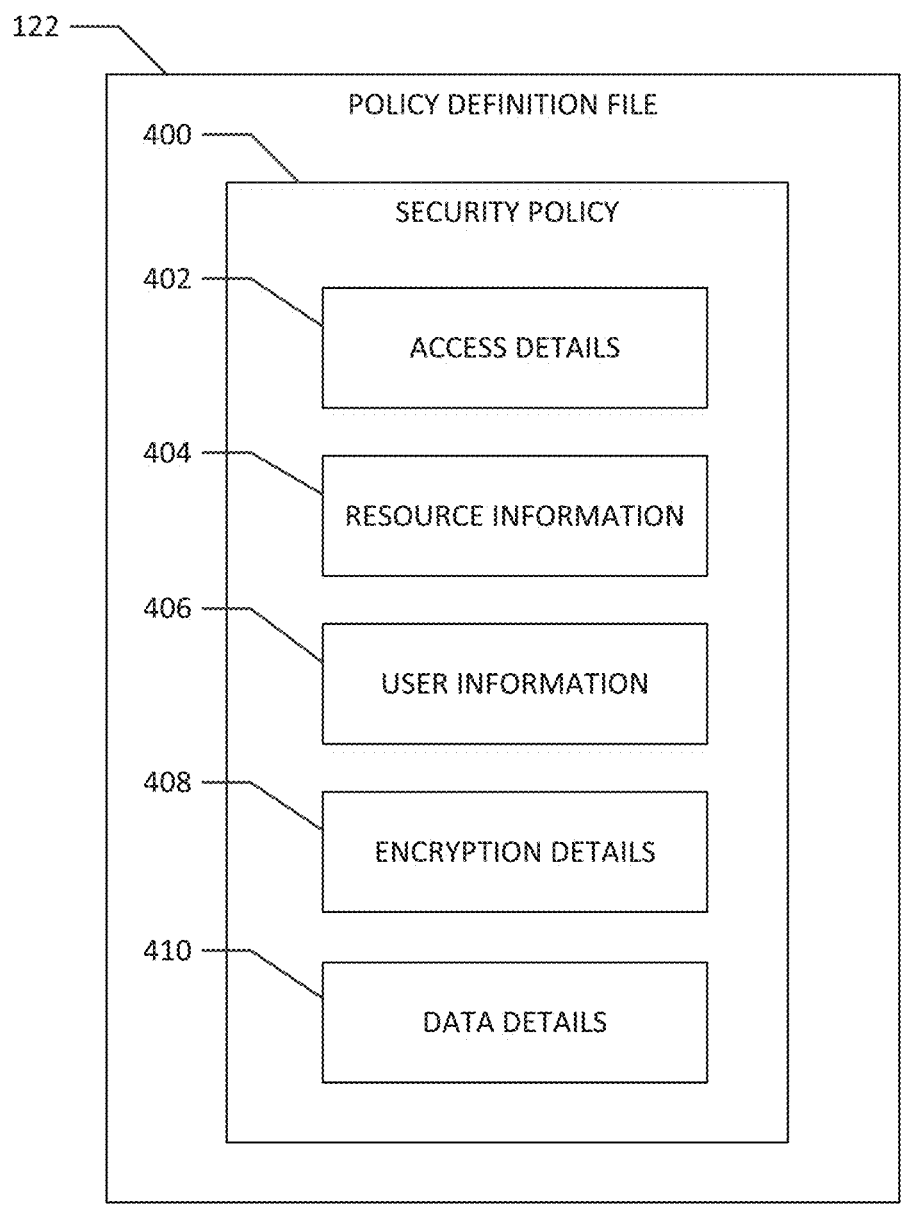
FIG. 8 illustrates an example policy definition file in accordance with an embodiment of the present disclosure.

FIG. 8 illustrates an example policy definition file 122 in accordance with an embodiment of the present disclosure. The policy definition file 122 is generated from the security parameters 104 relating to security policies and policy configurations in a network 106. The policy definition file 122 is designed to unify security policy definitions for a plurality of security devices 110 within a network 106.

The policy definition file 122 can be generated for security devices 110 within a specific network site 106. As described, the policy definition file 122 can be created by the security control module 112, and later parsed by the policy agent module 114 such that different policy definitions or configurations are passed to corresponding security devices 110 within the network site 106. In some embodiments, the policy definition file 122 can be created in the Extensible Markup Language (XML) format. In other embodiments, the policy definition file 122 can be made in any other formats understandable by humans and machines.

The policy definition file 122 includes security policies 400 to be implemented in the associated network site 106. For example, the policy definition file 122 includes policy configuration information for the security devices 110 in the network 106. In addition, the policy definition file 122 can define hosts, behaviors of the hosts, classifications of the hosts, purposes of the hosts, and other relevant information. Further, the policy definition file 122 can include user and group related configurations, such as identity and authentication information.

In at least some embodiments, security policies for different network sites or enterprises are contained in different policy definition files 122 in order to maintain the size of each policy definition file 122 and reduce the burden on the policy agent modules 114 that ultimately process the files 122.

As depicted in FIG. 8, the security policies 400 contained in the policy definition file 122 can include access details 402, resource information 404, user information 406, encryption details 408, and data details 410.

The access details 402 define several pieces of security information about end users. For example, the access details 402 can include users who are allowed to access, computing resources that are allowed to be accessed, the time when access is allowed, the places from which the users can access, and/or what behaviors or activities are permitted during access.

The resource information 404 defines several pieces of security information regarding the computing resources 108 (including the security devices 110) within the associated network 106. For example, the resource information 404 can include public, private, or link IP addresses of the computing resources, classifications (e.g., commodity, critical, or mission critical) of the computing resources, locations of the computing resources, group membership (e.g., HR, finance, DMZ or Internal) of the computing resources, and/or purpose/services (e.g., web servers, file servers, or print servers) of the computing resources. In some embodiments, the group membership of the computing resources is used to group at least some of the computing resources 108 such as the security devices 110 for several purposes. For example, the computing resources 108 are grouped to be managed together under policy configurations that are related each other or need to be coordinated together.

The user information 406 defines security information regarding users of the associated network 106. For example, the user information 406 can include group membership of the users and other attributes of the users. Similarly to the group membership of the computing resources, the group membership of the users can be used to group some of the users for different purposes, such as integral management of the users that are related each other or need to be coordinated together.

The encryption details 408 relate to information about data encryption. For example, the encryption details 408 can include encryption of data at rest, in transit and/or in use, encryption criteria, encryption strength, and re-key criteria. The encryption details 408 can be used to coordinate the encryption of the data stored in one or more computing devices (e.g., database servers and end-user computing devices) and migrated between different servers through one or more security devices 110 (e.g., firewalls). Different encryptions among the computing resources 108, such as database servers and security devices, can cause inefficient and dysfunctional management of data security. The policy definition file 122 with the encryption details 408 can coordinate the encryptions associated with different computing resources 108 and make them consistent to ensure integral management of data security.

The data details 410 relate to information about data stored and transferred in the network 106. For example, the data details 410 can include location of data, classification of data (e.g., unclassified, classified, secret, or top secret), clearance (e.g., HR, finance, external public, or data user), group associations (e.g., external, HR, finance or data owner), access mechanisms (e.g., FTP, WWW, or CIFS), access restrictions (e.g., read only, or read/write), encryption requirement, and usage restrictions (e.g., allowed only 9 AM to 5 PM).

Figure 9:
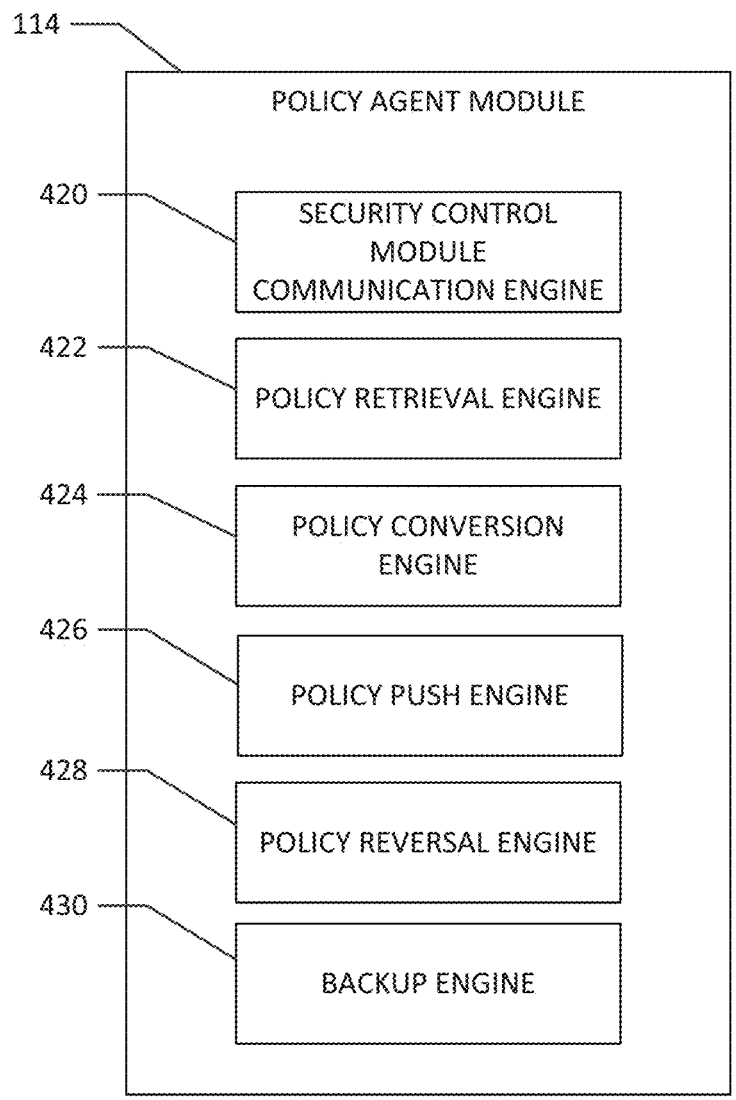
FIG. 9 is an example policy agent module in accordance with an embodiment of the present disclosure.

As described in FIG. 9, the policy agent modules 114 operates to pull its site-specific policy definition file 122 from the security control module 112, and parse and pass only the policy configuration information that is relevant to the security devices 110 the policy agent modules 114 serve. The relevant policy configurations from the policy definition file 122 can be found for the corresponding security devices 110 in several manners. In some embodiments, the policy configuration that is relevant to the corresponding security device 110 can be selected from the policy definition file 122 by referring to at least one of an IP address and a routing table entry of the security device 110.

FIG. 9 is an example policy agent module 114 in accordance with an embodiment of the present disclosure. The policy agent module 114 operates to control and configure the security devices 110 in the network site 106 that the policy agent module 114 serves. In at least some embodiments, the policy agent modules 114 are standalone applications and do not reside in a system in which other components of the security management system 102 are installed. In some embodiments, the policy agent modules 114 are positioned in proximity to the security devices that the policy agent modules serve. Example configurations of the policy agent modules 114 are illustrated and described in more detail with reference to FIGS. 10 and 11. In at least some embodiments, each policy agent module 114 is configured to serve only one security device 110. Thus, the security management system 102 typically includes a plurality of policy agent modules 114 to manage a plurality of security devices 110 in a network. The policy agent module 114 can be designed to serve only one security device 110 and perform only specific tasks.

In at least some embodiments, the policy agent module 114 can include a security control module communication engine 420, a policy retrieval engine 422, a policy conversion engine 424, a policy push engine 426, a policy reversal engine 428, and a backup engine 430.

The security control module communication engine 420 is configured to maintain communication between the policy agent module 114 and the security control module 112. As described herein, the policy agent module 114 always remains in communication with the security control module 112 so that the policy agent module 114 receives a request for configuration change from the security control module 112 and updates the security control module 112 with a result of configuration implementation. As described herein, with the implementation result, the security control module 112 can trigger the configuration checking module 116 to start functioning on the pushed configuration.

The policy retrieval engine 422 operates to fetch a policy definition file 122 from the security control module 112, the policy definition file 122 corresponding to the network 106 that the policy agent module 114 serves. Then, the policy retrieval engine 422 parses the policy definition file 122 to extract policy configuration parameters 124 (including 124a-n in FIG. 2) that are to be used in the corresponding security devices 110 in the network 106. Once an end-user requests a policy change via the user interface 120, the policy definition file 122 is generated by the security control module 112 and sent to all of the policy agent modules 114 at the network site 106. Upon receiving the policy definition file 122, the policy agent module 114 determines whether the policy definition file 122 contains information to which the policy agent module 114 needs to refer. This determination is made based on several criteria, such as whether the security device 110 that the policy agent module 114 serves has any IP address that is found in the policy definition file 122 (e.g., an IP address assigned to the security configuration parameter obtained from the policy definition file 122, or an IP address stored in a routing table to rout the traffic), whether the security device 110 belongs to a group and/or site specified in the received policy definition file 122, whether the security devices 110 belongs to a classification and/or site specified in the received policy definition file 122, and whether the security device 110 belongs to a purpose, service, and/or site specified in the received policy definition file 122. As such, the policy retrieval engine 422 can select and extract the policy configuration parameters 124 that are associated with specific security devices 110 among other configuration parameters contained in the policy definition file 122.

The policy conversion engine 424 can convert the information contained in the policy definition file 122 to the policy configuration parameters 124 in a format usable in the security device 110 that the policy agent module 114 serves.

The policy push engine 426 operates to pass and apply the extracted and converted policy configuration parameters 124 to the corresponding security device 110 that the policy agent module 114 serves. By the operation of the policy push engine 426, the security device 110 can be configured as required by the security policy that is input to the security management system 102 via the user interface 120. In at least some embodiments, the converted policy configuration parameters 124 are deployed in the security device 110 that the policy agent module 114 is serving, and the result of the implementation along with other data (e.g., an exit code) are passed back to the security control module 112 for further processes. In at least some embodiments, before pushing the policy configuration parameters 124, the policy agent module 114 can operate to back up the existing security configuration and push the new policy configuration parameters only when the backup is successful.

The policy push engine 426 can associate the policy configuration parameters 124 with the security devices 110 in several manners. For example, the policy push engine 426 can match the configuration parameters with the security devices, for example, based upon an IP address, by referring to a routing table associated with the security devices, and/or by matching group/classification information in the policy definition file 122 with that of the security device 110.

If the newly deployed security configuration does not perform as required, the policy reversal engine 428 operates to locate the previous policy configuration from its backup and pushes it to the security device 110 to restore the security device 110 with the previous policy configuration. If the checking module 116 or a security administrator detects that the deployment of security configuration has not been successful, the checking module 116 or the security administrator can request a policy reversal. Upon receiving the request, the policy reversal engine 428 can perform a rollback process, as described in more detail with reference to FIG. 12.

The backup engine 430 operates to back up the existing policy configuration information associated with the security devices 110 in the network 106. In some embodiments, the policy configuration information backed up can be at least temporarily stored to be used when the pending policy configuration fails or does not meet the requirements of the relevant security policy. For example, as described herein, when it is found that one or more security devices 110 are not properly configured, the policy agent module 114 can receive a rollback command from the checking module 116 via the security control module 112 or manually from a security administrator (e.g., when the administrator has misunderstood or misfed security policy information into the system), and perform a rollback process using the policy configuration information that has been backed up by the backup engine 430. Further, the policy configuration information backed up can be used for several purposes. In some embodiments, the policy configuration information can be backed up for audit trail, or for reverting to old configuration manually for testing or other purposes. In other embodiments, the backup configuration information can be sent to other modules in the security management system 102. For example, the existing policy configuration information can be passed to the checking module 116 for checking the implementation result and/or analyzing possible improvement in security management. Further, the policy configuration information can be sent to the reporting module 118 via, for example, the security control module 112, to be reported via the user interface 120.

Figure 10:
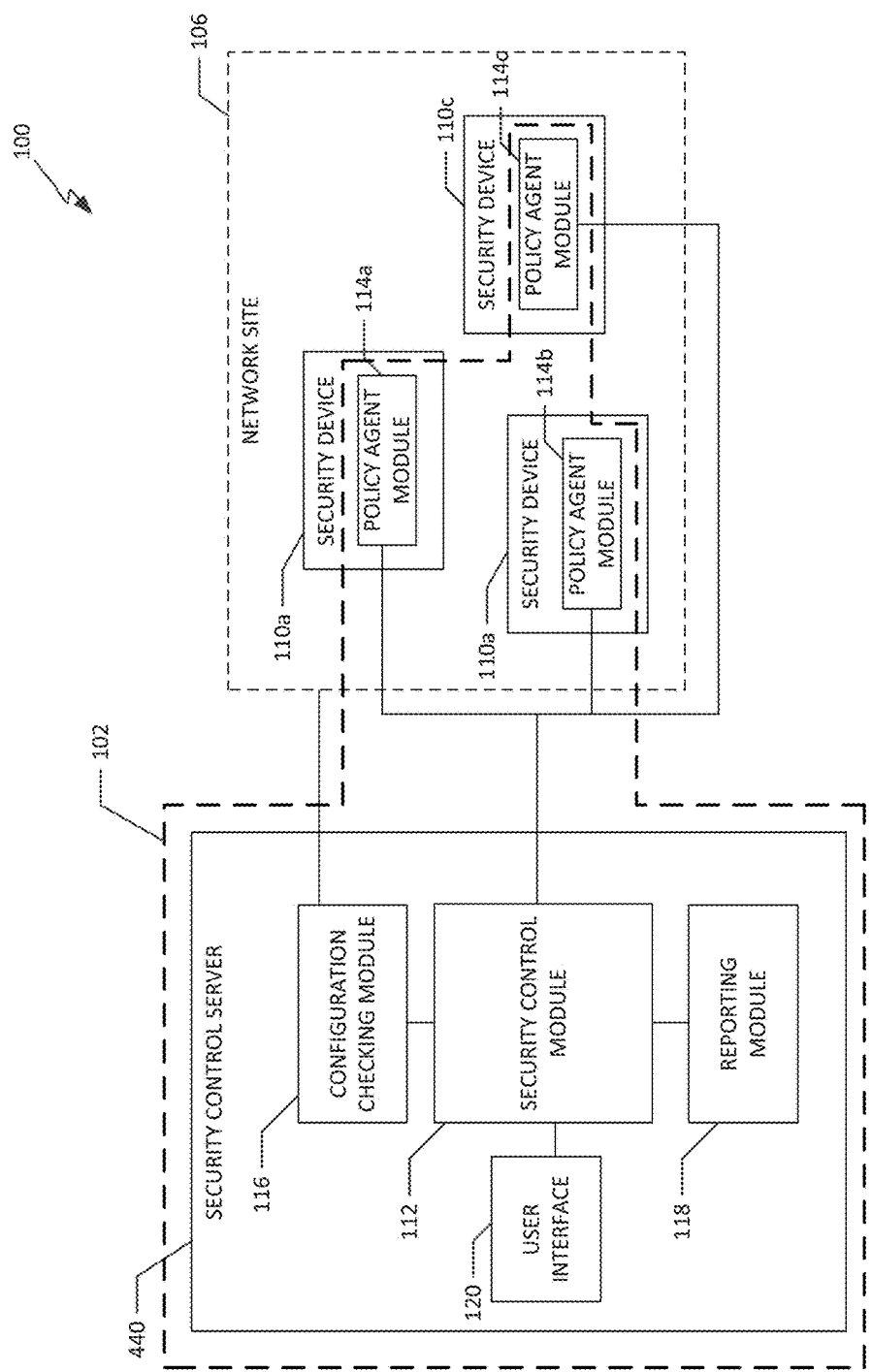
FIG. 10 is a block diagram of the security management system of FIG. 2 with the policy agent module of FIG. 9 provided as an embedded module.
Figure 11:
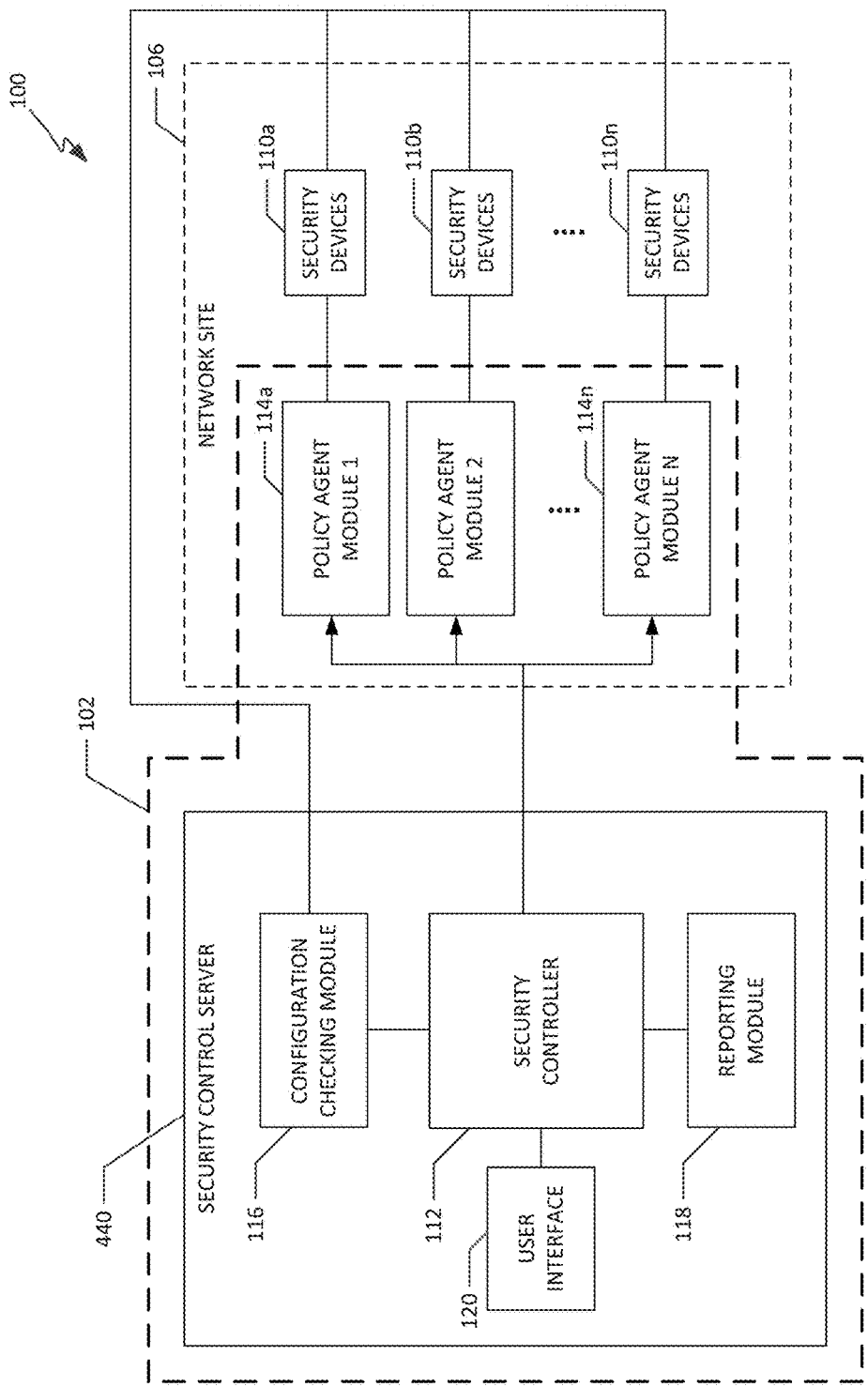
FIG. 11 is a block diagram of the security management system of FIG. 2 with the policy agent module of FIG. 9 provided as an external module.

FIGS. 10 and 11 are block diagrams of the security management system 102, illustrating different examples of the policy agent modules 114 (including 114a-c). The policy agent modules 114 can be provided as either embedded modules (FIG. 10) or external modules (FIG. 11).

Referring to FIG. 10, the policy agent modules 114 are embedded in the security devices 110. For example, the policy agent modules 114 can be installed as an application in the security devices 110, whereas other modules (e.g., security control module 112, the checking module 116, and the reporting module 118) and other components (e.g., the user interface 120) are located at a security control server 440 that is independently provided from the security devices 110 in the network site 106. This type of policy agent module 114 can be used when a security device 110 runs as an application installed on a general-purpose operating system, such as Windows or Linux. The policy agent module 114 that controls a particular security function in a server can be installed on the same server. Thus, the policy agent module 114 runs in the security device 110 and communicates with the security control module 112 through an encrypted channel over the network.

Referring to FIG. 11, on the other hand, the policy agent modules 114 can be provided to be external from the security devices 110. In some embodiments, the policy agent modules 114 can be installed in a dedicated server different from the security control server 440 in several cases, such as where the associated security devices 110 do not allow an application to be installed therein or where it is more advantageous to manage the policy agent modules 114 separately from the associated security devices 110. The plurality of policy agent modules 114 can be executed either in a single server or in a plurality of servers. In some embodiments, such a dedicated server or a plurality of dedicated servers for the policy agent modules 114 is separate from the associated security devices 110, but can be physically located adjacent the security devices 110 to eliminate communication issues or problems with the security control module 112. This types of external policy agent module 114 can be used when the security device 110 does not run on any general-purpose operating system or runs in a version that prevents installation of the policy agent module 114 thereon. Although it is illustrated in FIGS. 10 and 11 that all of the policy agent modules 114 are installed in either the associated security devices 110 (FIG. 10) or a dedicated server (FIG. 11), some of the policy agent modules 114 can be installed in the security devices while the rest of the policy agent modules 114 are provided in such a dedicated server. In other embodiments, a composite agent module can be used where a security device is installed on a general-purpose operating system and there are more than one security services or applications are installed in the same server. A composite agent module is a combination of necessary policy agent modules, which is created by a security administrator. For example, if there is a Windows server performing as a file server and also deploying a host-based firewall, a security administrator can choose policy agent modules to combine in order to perform security policy configuration for both the file server and the firewall. When combined, the security administrator has a single installer which has policy agent modules for both the firewall and the file server.

Figure 12:
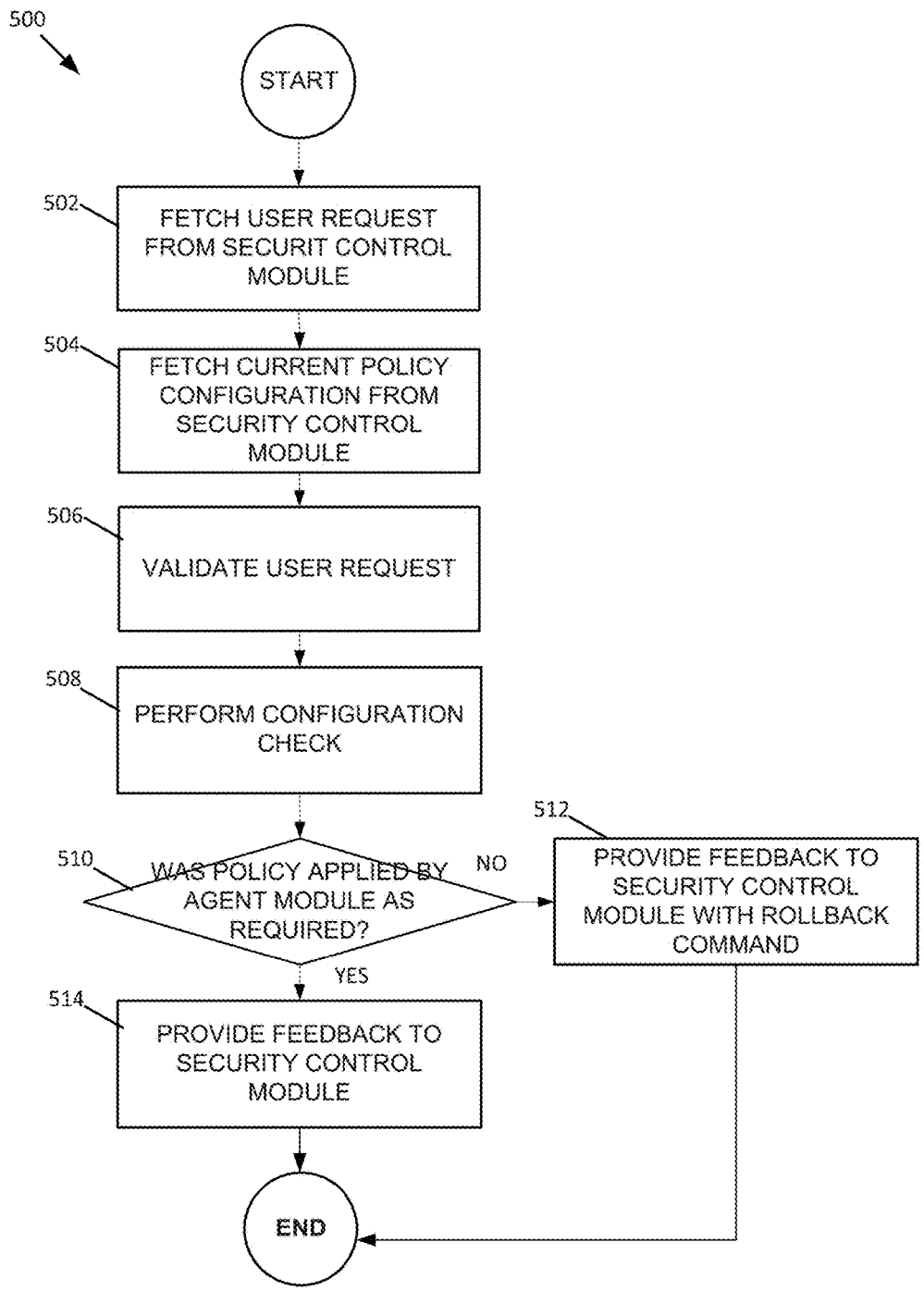
FIG. 12 is a flowchart illustrating an example method of operating a checking module.

FIG. 12 is a flowchart illustrating an example method 500 of operating the checking module 116. The checking module 116 monitors to check if the policy agent modules 114 properly operate to configure the security devices 110 as required by the security policy. In at least some embodiments, the method 500 may be performed by an application or process executing on one or more computing devices in the security management system 102. The computing devices can be configured as ones described with reference to FIG. 3. Furthermore, the method may be performed in software, hardware, or a combination of both software and hardware.

In the example shown, the method 500 begins at operation 502. At the operation 502, the checking module 116 operates to fetch the original user request for policy change from the security control module 112. This is to understand the original request from the end-user and check if the configuration performed meets the request. In some embodiment, the checking module 116 requests the security control module 112 for the user request information and receives the information in a format understandable by the components in the system 102. In some embodiments, the checking module 116 can parse the policy definition file 122 to obtain security configuration information (e.g., the policy configuration parameters 124) for the security device 110.

At operation 504, the checking module 116 fetches a current policy configuration from the security control module 112. For example, the checking module 116 receives the current security configuration information of the security device 110 in the format understandable by the components in the system 102. The security configuration information received from the security device 110 represents the current security policy implemented in the security device 110.

At operation 506, the checking module 116 can operate to validate the request received from the end-user.

At operation 508, the checking module 116 operates to perform configuration check. In at least some embodiments, the checking module 116 checks if the policy configuration parameters 124 have been properly applied to the corresponding security device 110 as required by the security policy. For example, the checking module 116 determines whether the policy configuration parameters 124 pushed by the policy agent module 114 were deployed in a correct security device 110, whether the policy configuration parameters 124 were deployed in the security device 110 in an intended manner, and/or whether the deployed policy configuration parameters 124 are delivering a result as required.

The configuration check can be performed at least in two different manners: (1) active configuration check and (2) collaborative (or manual) configuration check. In the active configuration check, the checking module 116 actually communicates with the security device 110 to determine if the security device 110 has been configured as required. For example, if a firewall port opening was requested, the checking module 116 can perform telnet to the requested port to find if the port is actually opened. In some embodiments, every asset managed by the system 102 can be configured to have an additional specific field that is used to identify if any change in the asset can be monitored by the checking module 116. The field is dedicated to give a privilege to the checking module 116 for it to perform the configuration check properly. If this field is enabled, the policy agent module 114 operates to whitelist the checking module 116 for performing the active configuration check.

In the collaborative configuration check, the checking module 116 performs the processes as described in the active configuration check except that, once gathering the relevant information, the checking module 116 builds an active check script and provide it to a security administrator. Instead of the checking module 116, the security administrator performs configuration check based on the information provided by the checking module 116 and reports back the result. In some embodiments, the collaborative configuration check can be performed where the active configuration check is not possible for various reasons.

In some embodiments, the checking module 116 can perform configuration check by communicating in real time with the policy agent modules 114. The checking module 116 can maintain communication with the policy agent modules 114 through the security control module 112. In some embodiments, the policy agent module 114 can have the IP address of the checking module 116 to allow the checking module 116 to perform the active check.

At operation 510, the checking module 116 determines, based on the configuration check at operation 508, whether the policy configuration parameters 124 have been applied to the corresponding security device 110 as required. If it is found that the security devices 110 are not properly configured as required by the security policy ("NO" at the operation 510), the method 500 proceeds to operation 512. If not ("YES" at the operation 510), the method 500 continues to operation 514.

At operation 512, the checking module 116 provides feedback to the security control module 112 with a rollback command. Then, the security control module 112 passes the command to the policy agent module 114 to perform a rollback of the policy configuration. In particular, the policy agent module 114, which is associated with the security device 110 that is not properly configured, is informed from the security control module 112 to perform the rollback process. The checking module 116 communicates with the policy agent modules 114 via the security control module 112. For example, the checking module 116 can send a notification message to the security control module 112 if one or more security devices 110 do not meet the requirement defined by the security policy definition file. When the security control module 112 receives the notification message from the checking module 116, the security control module 112 operates to send a rollback message or command to the corresponding policy agent modules 114. Then, the policy agent modules 114 can perform a rollback of the associated security devices 110.

When the rollback is performed, the security devices 110 are restored to the previous security configuration or any previous status. In some embodiments, during the rollback operation, the policy agent modules 114 can use the policy configuration information that is stored up by the backup engine 430 to restore the previous security configuration.

At operation 514, the checking module 116 can send an implementation feedback message to the security control module 112. The operation 514 can operate generally concurrently with other operations discussed in connection with the method 500. The implementation feedback message can include a configuration status of the security devices 110. Receiving the feedback from the checking module 116, the security control module 112 can analyze the feedback to identify existing or potential security issues and suggest possible improvement in the security configuration and other security management, as described herein.

Overall, a number of advantages of the methods and systems of the present disclosure exist and are described throughout the disclosure. For instance, the network security management system according to the present disclosure can provide a single system for unifying security policies into a policy definition file and configuring all security devices in an enterprise network based upon the unified policy definition file. As such, the system can integrate a portion, or all, of the security policies, and therefore simplify overall enterprise security management and reduce dependency on security configuration subject matter experts. Additional advantages also exist that may not have been explicitly described herein.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for configuring a plurality of assets located at a single network site, the plurality of assets including at least a first security device operating under a first security policy configuration, and a second security device different from the first security device and operating under a second security policy configuration that is different from the first security policy configuration, the system comprising:
   a security control server communicatively connected to the first security device and the second security device;
   a security control module executable on the security control server to convert one or more security parameters specific to the first security policy configuration and one or more security parameters specific to the second security policy configuration into a single security policy definition file;
   a plurality of policy agent modules including at least a first policy agent module associated with the first security device, and a second policy agent module different from the first policy agent module and associated with the second security device, the first policy agent module being located at the security control server or at the network site in association with the first security device and configured to:
receive the single security policy definition file from the security control module of the security control server;
determine if one or more policy configuration parameters from the single security policy definition file should be deployed to one or more of the assets based on the importance of the asset in a network topology;
when it is determined, that one or more the policy configuration parameters from the single security policy definition file should be deployed to the first security device, extract the one or more policy configuration parameters from the single security policy definition file that are applicable to the first security policy configuration and push the applicable policy configuration parameters out to the first security device to update the first security policy configuration;
the second policy agent module being located at the security control server or at the network site in association with the second security device and configured to:
receive the single security policy definition file from the security control module of the security control server;
determine if one or more policy configuration parameters from the single security policy definition file should be deployed to one or more of the assets based on the importance of the asset in a network topology;
when it is determined, that a second one or more of the policy configuration parameters from the single security policy definition file should be deployed to the second security device, extract the second one or more policy configuration parameters from the single security policy definition file that are applicable to the second security policy configuration and push the applicable policy configuration parameters out to the second security device to update the second security policy configuration, the second one or more policy configuration parameters being different from the one or more policy configuration parameters extracted by the first policy agent module; and
a checking module executable on the security control server to determine that the policy configurations pushed to the first security device and the second security device have or have not appropriately configured the an associated security device from among the first and second security devices as required by the policy definition file, the checking module further executable to send a feedback message to the security control module based on the determination, the feedback message including configuration information of the associated security device, the configuration status of the associated security device, and whether the first and/or second policy agent modules have operated properly to configure the associated security device,
wherein the security control module analyzes the feedback message to generate a proposal to improve the single security policy definition file.

2. The system of claim 1, further comprising:
   a user interface configured to enable a user to input one or more of the security parameters.

3. The system of claim 1, wherein the checking module is configured to send a notification message to the security control module if one or more of the plurality of security devices does not meet the requirement defined by the security policy definition file.

4. The system of claim 3, wherein, when the security control module receives the notification message from the checking module, the security control module operates to send a rollback message to the first and/or second policy agent modules, the first policy agent module configured to perform a rollback of the first security device, and the second policy agent module configured to perform a rollback of the second security device.

5. The system of claim 1, wherein the checking module is configured to send a rollback message to the first and/or second policy agent modules through the security control module to cause the first policy agent module to perform a rollback of the first security device and/or to cause the second policy agent module to perform a rollback of the second security device.

6. The system of claim 1, further comprising a reporting module configured to report configuration information of the plurality of security devices.

7. The system of claim 1, wherein the first policy agent module is configured to back up existing policy configuration information associated with the first security device, and the second policy agent module is configured to back up existing policy configuration information associated with the second security device.

8. The system of claim 1, wherein the plurality of policy agent modules are is configured to match the one or more policy configuration parameters with one of the plurality of security devices based upon at least one of an IP address, a routing table associated with the one of the plurality of security devices, and matching group/classification information in the policy definition file with that of the one of the plurality of security devices.

9. The system of claim 1, wherein each one of the plurality of policy agent modules is installed to a corresponding one of the plurality of security devices.

10. The system of claim 1, wherein the plurality of security devices includes network security controls, data security controls, and endpoint security controls.

11. The system of claim 1, wherein the security policy definition file contains network access information, network resource information, user information, encryption information, and data storage information.

12. The system of claim 1, wherein the first security policy configuration and the second security policy configuration are implemented through one or more of network security controls, data security controls, and endpoint security controls.

13. The system of claim 12, wherein network security controls include one or more of firewalls, routers, network switches, and wireless access points.

14. The system of claim 13, wherein data security controls include one or more of data loss prevention solutions, encryption and digital signature.

15. The system of claim 14, wherein endpoint security controls include one or more of host-based intrusion detection systems, host-based intrusion prevention systems, host-based firewalls, and device controls.

16. The system of claim 1, wherein the proposal includes a recommendation for an improvement in security configuration and/or an improvement in management of the security devices within the single network site.

17. The system of claim 1, wherein the security control module reports the proposal through a user interface of the computing system.

18. A method for configuring a plurality of assets located at a single network site, the plurality of assets including at least a first security device operating under a first security policy configuration, and a second security device different from the first security device and operating under a second security policy configuration that is different from the first security policy configuration, the method comprising:
  receiving, at a security control server communicatively connected to the first security device and the second security device, one or more security parameters applicable to the first security policy configuration and receiving one or more security parameter applicable to the second security policy configuration through a user interface;
  automatically generating, at the security control server, a single security policy definition file from the received security parameters;
determining if one or more policy configuration parameters from the single security policy definition file should be deployed to one or more of the assets based on the importance of the asset in a network topology;
  when it is determined, that one or more of the policy configuration parameters from the single security policy definition file should be deployed to the first security device, extracting one or more policy configuration parameters from the single security policy definition file that are applicable to the first security policy configuration and pushing the applicable policy configuration parameters out to the first security device to update the first security policy configuration;
  when it is determined, that a second one or more of the policy configuration parameters from the single security policy definition file should be deployed to the second security device, extracting the second one or more policy configuration parameters from the single security policy definition file that are applicable to the second security policy configuration and pushing the applicable policy configuration parameters out to the second security device to update the second security policy configuration, the second one or more policy configuration parameters being different from the one or more policy configuration parameters;
  determining that the pushed applicable policy configuration parameters have or have not appropriately configured the first and/or second security devices as required by the single security policy definition file;
  determining whether a first and/or second policy agent modules located at the security control server or at a network site in association with the first security device operated properly to configure the associated security device; and
  based on the determinations, generating a proposal to improve the single security policy definition file.

19. The method of claim 18, further comprising:
performing a backup of existing policy configuration information associated with the plurality of security devices.

20. The method of claim 19, further comprising:
performing a rollback of the one of the plurality of security devices if the one of the plurality of security devices is determined to have not met the requirement defined by the security policy definition file.

21. The method of claim 19, further comprising:
performing a rollback of the one of the plurality of security devices if requested by a security administrator.

22. The method of claim 18, wherein the one or more policy configuration parameters is matched with one of the plurality of security devices based upon at least one of an IP address, a routing table associated with the one of the plurality of security devices, and matching group/classification information in the policy definition file with that of the one of the plurality of security devices.

23. The method of claim 18, further comprising:
monitoring if each of the plurality of security devices are configured as required by the single security policy definition file; and
reporting a configuration status of the plurality of security devices.

24. A system for configuring a plurality of security devices, the system comprising:
  a security control server communicatively connected to the security devices;
  a security control module executable on the security control server to convert security parameters to a common security policy definition file;
  a plurality of policy agent modules including at least a first policy agent module associated with a first security device from among the plurality of security devices, and a second policy agent module different from the first policy agent module and associated with a second security device, the first policy agent module being located at the security control server or at a network site in association with the first security device and configured to receive the security policy definition file and extract one or more policy configuration parameters from the common security policy definition file from the security control module of the security control server, the one or more policy configuration parameters associated with the first security device, the first policy agent module further configured to push out the one or more policy configurations to the first security device, the second policy agent module being located at the security control server or at the network site in association with the second security device and configured to receive the security policy definition file from the security control module of the security control server and extract one or more policy configuration parameters from the security policy definition file, the one or more policy configuration parameters associated with the second security device, the one or policy agent modules further configured to push out the one or more policy configurations to the second security device, the first and second security devices being different from each other and having different sets of policy configuration parameters; and a checking module executable on the security control server to determine that the policy configurations pushed to the first security device and the second security device have or have not appropriately configured an associated security device from among the first and second security devices as required by the policy definition file, the checking module further executable to send a feedback message to the security control module based on the determination, the feedback message including configuration information of the associated security device, the configuration status of the associated security device, and whether the first and/or second policy agent modules have operated properly to configure the associated security device, wherein the security control module analyzes the feedback message to generate a proposal to improve the policy definition file.

\* \* \* \* \*